United States Patent [19]

Morris

[11] 4,292,195

[45] Sep. 29, 1981

[54] NON-FUGITIVE ANTIOXIDANTS

[75] Inventor: Roger E. Morris, Cuyahoga Falls, Ohio

[73] Assignee: The B. F. Goodrich Company, Akron, Ohio

[21] Appl. No.: 796,900

[22] Filed: May 16, 1977

[51] Int. Cl.$^3$ .................................. C09K 15/16
[52] U.S. Cl. .................... 252/401; 252/403;
252/404; 252/406; 252/407; 260/29.7 R;
260/29.7 N; 260/45.9 R; 260/45.9 P; 528/88;
528/103; 528/104; 528/105; 528/109; 528/113;
528/120; 528/124; 528/361; 528/332; 528/407;
525/504; 525/508; 525/524; 525/529; 525/531;
525/533
[58] Field of Search ............... 252/401, 403, 407, 404,
252/406; 260/45.7 R, 45.9 P, 45.9 R, 29.7 R,
823, 29.7 N, 864

[56] References Cited

U.S. PATENT DOCUMENTS 3,696,851 10/1972 Randell .......................... 252/401
4,051,067 9/1977 Wilder ............................. 252/401

Primary Examiner—J. L. Barr
Attorney, Agent, or Firm—Armand P. Boisselle; J. Hughes Powell, Jr.

[57] ABSTRACT

Antioxidant compositions as described which are the reaction products of a mixture of
(a) at least one compound selected from compounds having the formula

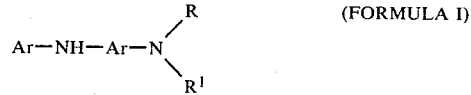

(FORMULA I)

wherein each Ar is an aromatic group, and R and $R^1$ are each independently hydrogen, alkyl, substituted alkyl, oxyalkylene or —C(O)—$R^2$—COOH groups wherein $R^2$ is an alkylene or alkenylene group, with the proviso that at least one of the R and $R^1$ groups must be hydrogen or a group containing at least one substituent reactive with an epoxy group, and

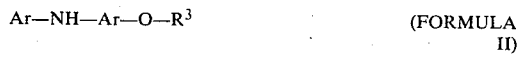

(FORMULA II)

wherein Ar is as defined above and $R^3$ is hydrogen, or a substituted alkyl group containing at least one substituent reactive with an epoxy group, or —C(O)—$R^2$—COOH wherein $R^2$ is an alkylene or alkenylene group, and (b) at least one polyepoxide having at least 2 epoxy groups per molecule. Optionally, the mixture also may contain (c) one or more co-reactants for the polyepoxide such as acids, alcohols, phenols and amines, and the products obtained from these mixtures can be reacted further with acid anhydrides to modify the properties.

These reaction products are useful as antioxidants in rubbers, plastics, oils, greases, etc., and they are particularly useful as stabilizers for rubbers and plastics since the rubbers and plastics containing such compositions present a high degree of resistance to the adverse effects of oxidative aging even when said rubbers and plastics are subjected to solvents which normally would extract a significant portion of conventional antioxidants.

36 Claims, No Drawings

NON-FUGITIVE ANTIOXIDANTS

BACKGROUND OF THE INVENTION

This invention relates to compositions which are useful as antioxidants for organic substances such as rubbers, plastics, oils and greases, and more particularly to rubber latices and vulcanized rubber compositions containing the antioxidant compositions of the invention.

Organic substances such as rubber, plastics, oils and greases essentially are all susceptible to deterioration as a result of prolonged exposure to aging in an oxygen atmosphere. A great deal of effort has been spent, and many antioxidant compositions have been suggested for use in reducing the degradative effects of oxygen on these materials. However, many of the compositions which heretofore have been suggested as antioxidants for these materials have not provided the desired long term stabilization effects possibly because of the tendency of many of the commercially available stabilizers to volatilize when the polymeric products are exposed to elevated temperatures over prolonged periods of time.

Another deficiency of the available antioxidants for stabilizing plastics and rubbers relates to the inability of the antioxidants to resist extraction when the rubbers and plastics are repeatedly brought into contact with aqueous detergent solutions or organic solvents. Suggestions have been made in the prior art for improving the longevity of the stabilization by utilizing antioxidants containing groups which are reactive with a polymer backbone thereby effecting a more permanent chemical bond between the antioxidant and the rubber or plastics. Other techniques which require that the antioxidant be incorporated into the polymer as it is formed also have been suggested.

Nitrile rubbers normally are used when rubber articles are required which have superior resistance to oil and hydrocarbons, good heat stability, abrasion resistance and low permanent set. Therefore, in the normal use of nitrile rubbers, the loss of antioxidants by extraction and/or volatilization is expected but not desirable. Since nitrile rubbers are used widely in automotive and related industries where operating temperatures have risen gradually, the service life of such rubber parts has been affected, and a demand for higher temperature resistant and stable nitrile rubbers has resulted.

SUMMARY OF THE INVENTION

The present invention provides compositions which are useful as antioxidants in rubbers, plastics, oils and greases. When incorporated into rubbers and plastics, the compositions are not readily extracted from the rubbers and plastics even when subjected to solvents at elevated temperatures.

The compositions which are useful as antioxidants comprise the reaction product of a mixture of (a) at least one compound selected from compounds having the formula

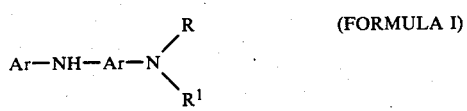   (FORMULA I)

wherein each Ar is an aromatic group, and R and $R^1$ are each independently hydrogen, alkyl, substituted alkyl, oxyalkylene or $-C(O)-R^2-COOH$ groups wherein $R^2$ is an alkylene or alkenylene group, with the proviso that at least one of the R and $R^1$ groups must be hydrogen or a group containing at least one substituent reactive with an epoxy group, and

   (FORMULA II)

wherein Ar is as defined above and $R^3$ is hydrogen, or a substituted alkyl group containing at least one substituent reactive with an epoxy group, or $-C(O)-R^2-COOH$ wherein $R^2$ is an alkylene or alkenylene group, and (b) at least on polyepoxide having at least 2 epoxy groups per molecule. Optionally, the mixture also may contain (c) one or more co-reactants for the polyepoxide selected from the group consisting of organic carboxylic acids, dicarboxylic acid monoesters, dicarboxylic acids, alcohols, thioalcohols, phenols, thiophenols, aliphatic monoamines, aliphatic diamines, mercaptoacids, mercaptoacid esters, alkylthiocarboxylic acids and arylthiocarboxylic acids. The above reaction products, when further modified by reaction with anhydrides, also are found to be very resistant to extraction by solvents.

The invention also relates to stabilized polymer latices and cured or vulcanized polymer compositions containing the above described antioxidant compositions.

DESCRIPTION OF THE PREFERRED EMBODIMENTS

It now has been found that the stability of rubbers, plastics, oils and greases to atmospheric oxidation can be improved by including in these materials, a compound which comprises the reaction product of a mixture of (a) at least one compound selected from compounds having

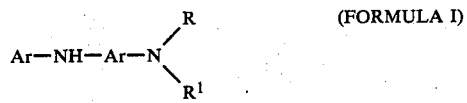   (FORMULA I)

wherein each Ar is an aromatic group, and R and $R^1$ are each independently hydrogen, alkyl, substituted alkyl, oxyalkylene or $-C(O)-R^2-COOH$ groups wherein $R^2$ is an alkylene or alkenylene group, with the proviso that at least one of the R and $R^1$ groups must be hydrogen or a group containing at least one substituent reactive with an epoxy group, and

   (FORMULA II)

wherein Ar is as defined above and $R^3$ is hydrogen, or a substituted alkyl group containing at least one substituent reactive with an epoxy group, or $-C(O)-R^2-COOH$ wherein $R^2$ is an alkylene or alkenylene group, and (b) at least one polyepoxide having at least two epoxy groups per molecule.

The amine-containing compounds of formula (I) are available commercially or may be prepared from commercially available materials. The aromatic groups (Ar) may contain substituents so long as such substituents do not interfere with the reaction between the amine compound and the polyepoxides. The alkyl groups, R and $R^1$ preferably contain from one to ten carbon atoms and may further contain substituents which may or may not be reactive with the polyepoxides such as hydroxyl, carboxyl, amino, etc. The R and/or $R^1$ groups also may be oxyalkylene groups obtained by reaction of an amino hydrogen with a halo-alcohol, or halo-polyhydroxy compound or an epoxide. An example of such a group is the following which results from the reaction of the amino hydrogen with an alkylene oxide

wherein $R^5$ is a straight or branched chain alkylene group, and n is a number from one to about 20. When ethylene oxide is used, $R^5$ is ethylene and when propylene oxide is used, $R^5$ is a 1,2-propylene group.

The R and $R^1$ groups also may have the structure —C(O)—$R^2$—COOH wherein $R^2$ is an alkylene or alkenylene group containing from one to ten carbon atoms. As mentioned above, when selecting the groups R and $R^1$ to be attached to the nitrogen atom, it is imperative that at least one of the groups be hydrogen or a group containing at least one substituent which is reactive with an epoxy group such as hydroxyl, carboxyl, amino, mercapto, etc.

A preferred amine reactant for preparing the compositions of the invention has the structure

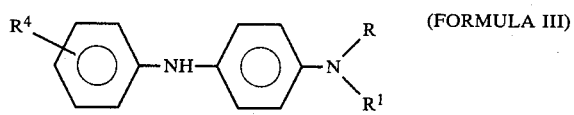

(FORMULA III)

wherein $R^4$ is hydrogen, $A_2N$ or AO wherein A is an alkyl or substituted alkyl group, and R and $R^1$ are as defined above in formula (I). Preferably $R^4$ is in the para position and is hydrogen. Two of the preferred and readily available amine compounds having the formula (III) are p-aminodiphenyl-amine (R, $R^1$, and $R^4$=H, hereinafter referred to as PADPA) and the corresponding composition where $R^1$ is an alkyl radical such as 1,3-dimethyl butyl. Another example of a useful amino reactant is p-isopropylaminodiphenylamine.

The compound which is reacted with the polyepoxide in accordance with the invention either alone or in a mixture with a compound of formula (I) may be a compound having the structure

(FORMULA II)

wherein Ar is an aromatic group and $R^3$ is hydrogen or a substituted alkyl group containing at least one substituent reactive with an epoxy, or —C(O)—$R^2$—COOH wherein $R^2$ is an alkylene or alkenylene group as defined above with respect to formula (I). The aromatic group may contain substituents so long as such substituents do not interfere with the reaction of the compound with the polyepoxide. Examples of substituted alkyl groups include alkyl groups containing such substituents as —OH,—SH,—COOH, etc. The alkyl group includes groups obtained by reaction of an alkylene oxide with a compound of the formula Ar—N-H—Ar—O—H. Thus, $R^3$ may be a group having the formula

wherein $R^5$ is a straight or branched chain alkylene radical which may contain aromatic or cyclic groups, and n varies from one to about 20.

The polyepoxides which are useful in preparing the antioxidant compositions of the invention contain at least two epoxy groups per molecule and the molecule may contain saturated or unsaturated groups, aliphatic, cycloaliphatic, aromatic or heterocyclic structures and may be substituted with non-interfering substituents such as ester groups, ether groups, and the like. Polyepoxides containing ether groups, generally designated as polyepoxide polyethers, may be prepared as well known in the art.

Illustrative examples of polyepoxide polyethers are as follows: 1,4-bis(2,3-epoxypropoxy)benzene; 1,3-bis(2,3-epoxypropoxy)benzene; 4,4'-bis(2,3-epoxypropoxy)-diphenyl ether; 1,8-bis(2,3-epoxypropoxy)octane; 1,4-bis(2,3-epoxypropoxy)-cyclohexane; 1,3-bis(4,5-epoxypentoxy)-5-chlorobenzene; 1,4-bis(3,4-epoxybutoxy)-2-chlorohexane; diglycidyl thioether; diglycidyl ether; ethylene glycol diglycidyl ether; propylene glycol diglycidyl ether; 1,4 butanediol diglycidyl ether; diethylene glycol diglycidyl ether; 1,2,3,4-tetrakis(2-hydroxy-3,4-epoxybutoxy)butane; 2,2-bis[para(2,3-epoxypropoxyphenyl)]propane; glycerol triglycidyl ether; pentaerythritol tetraglycidyl ether; sorbitol tetraglycidyl ether; glycerol diglycidyl ether; etc. The polyepoxide polyethers may or may not contain hydroxy groups, depending primarily on the method of preparation, and the amount can be varied by methods well known in the art.

Polyepoxides which do not contain ether groups may be employed as for example 1,2,5,6-diepoxyhexane; butadiene dioxide (that is 1,2,3,4-diepoxybutane); isoprene dioxide; limonene dioxide, and cyclic polyepoxides having the formulas

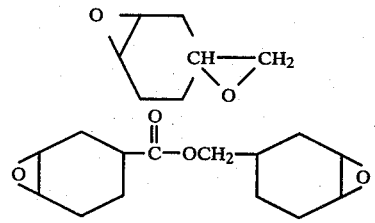

In general, the polyepoxide polyethers are preferred and, more particularly, the polyepoxide polethers of the class of glycidyl polyethers of polyhydric alcohols or polyhydric phenols. These compounds may be considered as being derived from a polyhydric alcohol or polyhydric phenol by etherification with at least two glycidyl groups

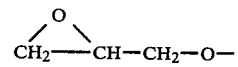

The alcohol or phenol moiety may be completely etherified or may contain residual hydroxy groups. Typical examples of compounds in this category are the glycidyl polyethers of ethylene glycol, glycerol, 1,4-butanediol, diethylene glycol, 2,2-bis(parahydroxyphenyl)propane, or any of the other polyols listed hereinabove as useful for preparation of glycidyl ethers. Particularly, preferred among the glycidyl polyethers are those derived from 2,2-bis(parahydroxyphenyl)propane (hereinafter designated as DGEBA)

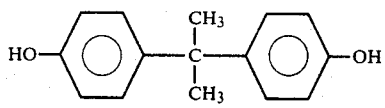

and those derived from ethylene glycol or 1,4-butanediol (hereinafter designated at DGEBD). The commercially available compounds derived from the first-named of these polyols have molecular weights of from about 350 to 8,000. Of this class of polyepoxides it is preferred to employ the lower molecular weight compounds.

Epoxides of the types described above and useful in this invention are available from a wide variety of commercial sources.

The polyepoxides are conventionally termed as epoxy resins even though the compounds are not technically resins in the state in which they are sold and employed because they are of relatively low molecular weight and do not have resinous properties as such. One group is known by the general trade designation "Epon" resins, and these are available from the Shell Chemical Company. For example, "Epon 820" is an epoxy resin having an average molecular weight of about 380 and is prepared from 2,2-bis(p-hydroxyphenyl)propane and epichlorohydrin. Similarly, "Epon 1031" is an epoxy resin having an average molecular weight of about 616 and is prepared from epichlorohydrin and symmetrical tetrakis(p-hydroxyphenyl)ethane. "Epon 828" has a molecular weight of 350–400, an epoxide equivalent of about 175–210, and is prepared by etherification of 2,2-bis(p-hydroxyphenyl)propane with at least two glycidyl groups. This latter polyepoxide also is referred to in the art as a diglycidyl ether of "Bisphenol A".

Mixtures of more than one polyepoxide can be utilized in the invention as well as mixtures of polyepoxides with monoepoxides. The use of a monoepoxide with a polyepoxide generally results in the formation of a product which is more fluid and more easily handled. It appears that the monoepoxide acts as a reactive diluent for the compositions of the invention. The preferred monoepoxides are aliphatic epoxides which may contain some aromatic groups. Examples include: ethylene oxide; propylene oxide; 1,2-epoxybutane; 1,2-epoxyhexane, 2,3-epoxy-3-phenoxy propane and epihalohydrins such as epichlorohydrin and epibromohydrin. Although the reactive monoepoxide improves product viscosity with excellent pre-extraction antioxidant activity, the ability of the compositions to survive acetone extraction may be diminished with high levels of monoepoxide. Thus, the molar ratio of monoepoxide to polyepoxide in the mixtures should not be greater than 4:1 and is preferably less than 1:1.

The reaction between compounds having the formula (I), (II), or (III), or mixtures thereof and the polyepoxides, mixtures of polyepoxides, or mixtures of polyepoxides with monoepoxides is accomplished on mixing or by heating a mixture of the ingredients. Frequently, the reaction is exothermic and may occasionally require some cooling. Generally the time and temperature of the reaction may be varied as desired to produce compositions having different molecular weights and different amounts of residual epoxy groups. Similarly, the molar ratios of the ingredients can be varied to produce desired effects in the products. Generally higher molecular weight compounds are obtained at elevated temperatures and with longer reaction times. The precise structures of the compositions of this invention have not been determined in view of the complex and varied reactions which can and do occur between the reactants. The products of the reaction, however, have exhibited the improved resistance to extraction by solvents as desired.

The properties of the compositions of the invention prepared by reacting a polyepoxide with a compound of formulas (I) and (II) can be further modified by including a co-reactant in the reaction mixture. Examples of co-reactants which have been found to be desirable in the mixtures of the invention include carboxylic acids, dicarboxylic acid monoesters, dicarboxylic acids, alcohols, thioalcohols, phenols, thiophenols, aliphatic monoamines, aliphatic diamines, mercaptoacids, and mercaptoacid esters, alkylthiocarboxylic acids and arylthiocarboxylic acids. The co-reactants react primarily with the epoxide groups in the reaction mixture and not with compounds (I) and (II) in the same mixture. The amount of co-reactant included in the mixture may be varied by one skilled in the art depending upon the desired modification of properties. Variations in the amount and type of co-reactant can result in a lowering of the softening range of the product.

Among the co-reactants mentioned above, saturated or unsaturated carboxylic acids, alkyl- or arylthiocarboxylic acids and esters of mercaptoalkylcarboxylic acids are preferred. Acrylic and methacrylic acids, and esters of mercaptoacetic and 3-mercaptopropionic acids have been found to be particularly useful as co-reactants. Although the amount of co-reactant included in the mixture may vary over a wide range, it is preferred that the amount, as expressed in equivalents, not be more (and preferably less) than 1.5 times the number of equivalents of the reactive antioxidant and that the total equivalents of the reactive antioxidant and co-reactant be no more than equal to the equivalents of available reactive epoxy groups. For example, two equivalents of a polyepoxide could be combined with 0.8 equivalents of the compound of formulas (I) and (II), and 1.2 equivalents of co-reactant.

Specific examples of co-reactants which are useful in preparing the compositions of the invention include: maleic acid; succinic acid; 2-chloropropionic acid; 3-chloropropionic acid; chloracetic acid; methacrylic acid; acrylic acid; 2-ethylhexanoic acid; benzoic acid; crotonic acid; stearic acid; crotyl alcohol; acetic acid; mercaptoacetic acid; iso-octyl mercaptoacetate; iso-octyl-3-mercaptopropionate; diallylamine; S-octylthioacetic acid; 2-hydroxyethyl acrylate; monethyl adipate; 3-mercaptopropionic acid; S-benzylthioacetic acid; ethyl mercaptoacetate; n-butylmercaptoacetate; methyl thioglycollate; dodecyl mercaptoacetate; glycol dimercaptoacetate; octadecyl mercaptoacetate; and 2-hydroxyethyl methacrylate.

Compounds which are known in the art to be useful as catalysts or curing agents for reactions between epoxy compounds and amines may be utilized in small amounts in the reactions described above. The catalysts generally used in this invention are basic agents such as Lewis bases, inorganic bases, primary and secondary amines and amides. Acidic catalysts of the phenolic type also are useful. Specific examples of catalysts include dialkylamines such as diallylamine and phenolic compounds such as p-methoxyphenol.

The compositions described above which are obtained by reacting one or more polyepoxides with a compound of the formula (I) or (II) with or without a co-reactant can be modified after formation by reacting the product of the reaction with an anhydride, and particularly a dicarboxylic anhydride. Examples of such anhydrides include maleic anhydride, succinic anhydride, etc. It has been found that the subsequent reaction with the anhydride gives products with excellent permanency and non-extractability of the antioxidants in rubbers and plastics.

Although the amount of anhydride used in the reaction may be varied over a wide range, the molar ratio of anhydride to reaction product can be as high as 2:1 but generally will be about 1:1 or less. The reaction can be conducted by heating the mixture of the reaction product and the anhydride in the presence or absence of a solvent such as methyl ethyl ketone optionally in the presence of a small amount of a catalyst such as triethylamine. The progress of the reaction can be followed by infrared spectroscopy which will show the formation of ester and acid carbonyl bands and the disappearance of the anhydride bands.

The following examples illustrate some of the compositions of the invention and the methods for preparing these compositions. Unless otherwise indicated, all parts and percentages are by weight.

EXAMPLE 1

In this example, p-aminodiphenylamine (PADPA) is reacted with a epoxide available commercially under the trade designation "Epon 828" from Shell Chemical Company. This polyepoxide has a molecular weight of 350 to 400, an epoxide equivalent of about 175 to 210 and is essentially the diglycidyl ether of Bisphenol A (DGEBA).

The reactions are conducted in a large test tube immersed in an oil bath which can be maintained at various temperatures as desired. The temperature of the oil bath is raised, and the contents of the test tube are stirred by hand. After the PADPA is dissolved, the mixture is warmed with occasional stirring, and depending upon the oil bath temperature, an exotherm may be observed, the extent of which varies with the imposed temperature. Upon heating, the initial fluid mixture becomes more viscous. If it is desired to prepare a product containing unreacted epoxy groups, the test tube is removed from the oil bath before the exotherm fully subsides, and the mixture is allowed to cool to room temperature. The product of the reaction is a glass (resin) which is recovered by breaking the test tube and then grinding the product.

As can be noted from the summary presented in Table I below, the products of this example are prepared utilizing various ratios of reactants and different bath temperatures. When the reaction mixture is heated to higher temperatures and/or subjected to longer reaction times, the products obtained are characterized by higher molecular weights as evidenced by their higher softening ranges. Infrared spectral examination of the products confirms that the higher softening range materials contain less residual epoxy content.

TABLE 1

| Example | Equivalent Ratio* Epoxy/Amine | Bath Temp. (°C.) | Reaction Time | Softening Range (°C.) |
|---|---|---|---|---|
| 1A | 2.65/1 | to 65° | 1.25 hr. | 44–51 |
| 1B | " | to 110 | 20 min. | 90–110 |
| 1C | " | to 110–113° C. | 11 min. | 140–150 |
| 1D | 1/1 | to 65° | 1.25 hr. | 45–54 |

*Assumes 2 equivalents for Epon 828 and 1 equivalent for PADPA

EXAMPLE 2

Utilizing the technique described in Example 1, 31 grams (0.16 mole) of N-1,3-dimethylbutyl-4-phenyl-p-phenylene diamine, hereinafter referred to as DMPPD, and 31 grams (0.115 mole) of the diglycidyl ether of 1,4-butanediol (DGEBD) in the presence of 1 ml. of triethylamine are reacted while maintaining the bath temperature at between 90° and 110° C. over a period of seven hours. On cooling, a viscous product is obtained.

EXAMPLE 3

A mixture of 27 grams (0.101 mole) of DMPPD, 13.5 grams (0.05 mole) of DGEBD and 1 ml. of triethylamine is reacted in a test tube immersed in a bath maintained at a temperature of 105°–110° C. for 12 hours. After four hours, 0.2 gram of triethylene diamine catalyst is added. The product of the reaction is an extremely viscous material, and an infrared spectrum of the product indicates very little residual free epoxy content.

EXAMPLE 4

The procedure of Example 1 is followed in reacting a mixture of 5.5 grams (0.03 mole) of PADPA with 2.2 grams (0.01 mole) of the triglycidyl ether of glycerol available from the Dow Chemical Company under the trade designation "Epoxy 7160" in the presence of 3 drops of triethylamine. The bath temperature is maintained at about 100° C. for 20 minutes, and an exotherm of 16° C. is observed. The contents of the test tube are cooled, and the product is recovered.

EXAMPLE 5

A mixture of 9.1 grams (0.05 mole) of PADPA and 10.1 grams (0.037 mole) of DGEBD is allowed to react in a test tube suspended in an oil bath at a temperature of 61°–67° C. over a period of three hours. A moderately exothermic reaction occurs. Upon cooling, a hard resin is obtained which exhibits some cold flow.

EXAMPLE 6

A mixture of 0.05 mole of PADPA and 0.086 mole of a cyclic polyepoxide available commercially under a trade designation "ERL 4221" from Union Carbide Corporation and which is principally

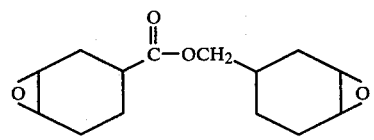

is placed in a test tube and heated in a bath maintained at a temperature of 105°–115° C. for 5.5 hours. The product is a viscous syrup which contains a significant amount of epoxy groups as shown by infrared spectroscopy.

EXAMPLE 7

A mixture of 18.3 grams (0.1 mole) of PADPA and 14 grams (0.1 mole) of a cyclic polyepoxide available under the designation "ERL 4206" from Union Carbide Corporation and which is principally

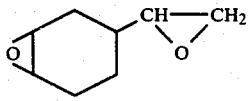

is reacted in the test tube immersed in a bath maintained at a temperature of about 90°–100° C. for a period of about five hours. The product obtained has a softening range of about 116°–126° C.

EXAMPLE 8

The procedure of Example 6 is repeated except that twice as much PADPA (36.6 grams, 0.2 mole) is used, and the mixture is heated to a temperature of 110°–115° C. for nine hours. The resinous product obtained in this manner has a softening range of 47°–56° C.

EXAMPLE 9

The procedure of Example 8 is repeated except that 36 grams (0.15 mole) of the polyepoxide is used in the reaction mixture which is heated at a temperature of 108°–110° C. for nine hours. The resinous product obtained has a softening range of 47°–56° C.

EXAMPLE 10

A mixture of 10.3 grams (0.056 equivalent) of PADPA and 10 grams (0.056 equivalent) of an epoxy novolak resin (epoxy equivalent weight of 178) available under the designation "DEN 438" from Dow Chemical Company is reacted in a test tube maintained in a bath. The bath temperature is raised to 70° C. and an exothermic reaction occurs. After the exothermic reaction subsides, the test tube is removed from the bath and allowed to cool. The resinous product obtained has a softening range of 70°–80° C.

EXAMPLE 11

The procedure of Example 10 is repeated except that the bath temperature is maintained at about 92° C. The resinous product obtained has a softening range of 120°–145° C.

EXAMPLE 12

A mixture of 9.2 grams (0.05 mole) of PADPA, 8.8 grams (0.048 mole) of p-hydroxydiphenylamine and 17 grams (0.05 mole) of "Epon 828" is heated in a test tube which is immersed in an oil bath at 60° C. for one hour, and a mild exotherm is observed. The resinous product obtained has a softening range of 50°–58° C.

EXAMPLE 13

A mixture of 27 grams (0.1 equiv.) of DMPPD, 8.2 grams of "Epon 828", 10.8 grams of DGEBD, 2.4 grams (0.026 equiv.) of epichlorohydrin in 5.5 grams of dioctyl sebacate is heated in a bath to a temperature of about 100°–103° C. for about seven hours. After cooling overnight, the mixture is reheated to a temperature of about 130° C. over a period of 4.5 hours. The desired resinous product is recovered.

EXAMPLE 14

The mixture of 7 grams (0.01 mole) of the product of Example 10 and 1 gram (0.01 mole) of succinic anhydride is dissolved in 50 ml. of methyl ethyl ketone, and 0.2 ml. of triethylamine is added. This mixture is heated with stirring under nitrogen, at a temperature of about 55°–65° C. The formation of ester and acid carbonyl bands, and the disappearance of the anhydride bands can be followed by infrared spectroscopy. Upon completion of the reaction, the solvent is removed, and the residue which is the desired resin product is ground to a powder for evaluation. This product has a softening range of from 45°–68° C.

EXAMPLE 15

The procedure of Example 14 is repeated except that maleic anhydride is used in lieu of the succinic anhydride. The product obtained in this manner has a softening range of from 45°–65° C.

EXAMPLE 16

A mixture of 0.04 mole of succinic anhydride and 0.04 mole of the product Example 8 is dissolved in about 50 ml. of methyl ethyl ketone, and 0.2 ml. of triethylamine is added. The mixture is heated with stirring, under nitrogen, at a temperature of from about 50° C. for about eight hours. After removal of the solvent, the product is recovered and has a softening range of from 60°–83° C.

EXAMPLE 17

A mixture of 20 grams (0.025 mole) of the product of Example 3 and 3.7 grams (0.037 mole) of succinic anhydride is dissolved in 50 ml. methyl ethyl ketone and 1 ml. of triethylamine is added. The mixture is stirred under nitrogen at a temperature of 60°–65° C. for about five hours. The infrared spectrum of the product obtained after removal of the solvent indicates the absence of anhydride band and the presence of ester carbonyl bands.

EXAMPLE 18

The procedure of Example 17 is repeated except that an equivalent amount of the product of Example 4 is utilized in place of the product of Example 3.

EXAMPLE 19

A mixture of 11.5 grams (0.05 mole) of the polyepoxide of Example 6, 4 grams (0.042 mole) of chloroacetic acid and 10 grams (0.055 mole) of PADPA is heated in a test tube immersed in a bath maintained at 31° C. The reaction proceeds exothermically as the bath temperature rises to 52° C. The mixture is removed and allowed to cool to give a product with a softening range of 54°–64° C.

EXAMPLE 20

A mixture of 34.7 grams (0.13 mole) of DMPPD, 2.7 (0.03 mole) of methacrylic acid, 24.4 grams (0.067 mole) of "Epon 828", and 9.0 grams (0.06 mole) of 1,2-epoxy-3-phenoxy propane is mixed at room temperature in a test tube and immersed in a cold oil bath. The bath is heated rapidly to and maintained at 70° C. for three hours and finally at 100° C. for 4.5 hours. The product is cooled and ground to a powder.

EXAMPLE 21

A mixture of 2.8 grams (0.039 mole) of acrylic acid, 27 grams (0.101 mole) of DMPPD, 10.8 grams (0.03 mole ) of "Epon 828", 8.1 grams (0.03 mole) of DGEBD, and 12 grams (0.08 mole) of 1,2-epoxy-3-phenoxypropane is heated to 70° C. over a period of 1.5 hours and then immersed in a bath maintained at 100° C. for a period of two hours. A mildly exothermic reaction is observed. The product obtained in this manner is very viscous at room temperature.

EXAMPLE 22

A mixture of 2.8 grams (0.039 mole) of acrylic acid, 27 grams (0.101 mole) of DMPPD, 16.2 grams (0.06 mole) of DGEBD, 12.0 grams (0.08 mole) of 1,2-epoxy-3-phenoxypropane in 5.5 grams of di(2-ethylhexyl)sebacate is heated in an oil bath to a temperature of from about 100° to 110° C. over a period of about three hours. The cooled reaction product is a viscous liquid.

EXAMPLE 23

The procedure of Example 22 is repeated except that 21.6 grams of DGEBD and 6.0 grams of the phenoxypropane are incorporated into the mixture. This mixture is heated in an oil bath to a temperature of about 100° C. over a period of about one hour and maintained at this temperature for an additional 3.5 hours. This product also is a viscous liquid.

EXAMPLE 24

A mixture of 3.6 grams (0.05 mole) of acrylic acid, 13.4 grams (0.05 mole) of DMPPD, and 17 grams (0.05 mole) of "Epon 828" is reacted in a test tube immersed in a bath maintained at a temperature of 58°-62° C. for two hours and thereafter at a bath temperature of 90° C. for 5.5 hours. The desired product which is obtained upon cooling has a softening range of 42°-53° C.

EXAMPLE 25

A mixture of 2.5 grams (0.035 mole) of acrylic acid, 13.7 grams (0.05 mole) of DMPPD, and 15.2 grams (0.056 mole) of DGEBD is reacted in a test tube immersed in a bath which is heated to a temperature of about 110° C. over a period of seven hours. An exotherm is observed at a bath temperature of about 90° C. The product which is obtained in this manner is a viscous liquid exhibiting ester carbonyl and a very small amount of epoxy groups in the infrared spectrum.

EXAMPLE 26

A mixture of 3 grams (0.032 mole) of chloroacetic acid, 13.7 grams (0.05 mole) of DMPPD and 13.7 grams (0.05 mole) of DGEBD is reacted in a test tube immersed in a bath at 60° C. for 0.5 hour and at 90° C. for about 50 minutes. The infrared spectrum of the product obtained in this manner confirms that essentially very little free epoxy groups remain in the product which is a viscous liquid.

EXAMPLE 27

A mixture of 3.6 grams (0.05 mole) of acrylic acid, 14.2 grams (0.053 mole) of DGEBD and 9.3 grams (0.05 mole) of PADPA is heated in a bath to 60° C. whereupon a vigorous exothermic reaction is observed. The product obtained in this manner is viscous at room temperature.

EXAMPLE 28

A mixture of 6.5 grams of acrylic acid, 18.3 grams of PADPA and 34 grams of "Epon 828" is heated gradually to a temperature of 60° C. and an exotherm of 84° C. is observed. The product obtained in this manner has a softening range of 83°-87° C., and the infrared spectrum indicated very little residual free epoxy groups.

EXAMPLE 29

A mixture of 19 grams (0.071 mole) of DMPPD, 15 grams (0.055 mole) of DGEBD, 4 grams (0.028 mole) of 2-ethylhexanoic acid and 4 grams of dioctyl sebacate (solvent) is placed in an oil bath at 130° C. whereupon an almost immediate exotherm occurs. The test tube is removed, cooled and thereafter returned to the bath at a temperature of 125° C. and maintained in the bath at this temperature for about 1.5 hours. The product is a viscous liquid.

EXAMPLE 30

A one liter, three-neck, round bottom flask equipped with magnetic stirrer, thermometer and reflux condenser is used in this Example. Into the flask there is added 108 grams (0.404 mole) of DMPPD, 20.8 grams (0.289 mole) of acrylic acid, 43.2 grams (0.12 mole) of "Epon 828", 77.2 grams (0.286 mole) of DGEBD, 40 grams of dioctyl adipate (solvent) and 4 grams each of p-methoxyphenol and diallylamine. This mixture is heated with stirring to a temperature of about 100° C. over a period of one hour and the mixture thickens. The mixture is heated for an additional hour and the desired product is obtained.

EXAMPLE 31

A mixture of 7.2 grams of acrylic acid 26.8 grams of DMPPD and 34 grams of "Epon 828" is heated quickly to a temperature of 90° C. and maintained at a temperature of about 92°-94° C. for four hours. A mild exotherm occurs which raises the temperature to about 108° C. before subsiding. The mixture is held at a temperature of 94° C. for an additional two hours and removed from the bath. The desired product is ground to a powder.

EXAMPLE 32

The procedure of Example 1 is repeated except that "Epon 828" is replaced with an equivalent amount of DGEBD. The product obtained in this manner is very viscous liquid at room temperature.

EXAMPLE 33

A mixture of 22.8 grams (0.1 mole) of p-isopropylaminodiphenylamine, 2.8 grams (0.04 mole) of acrylic acid, 12.2 grams of "Epon 828", 18.9 grams of DGEBD and 10 grams of dioctyl sebacate is heated to a temperature of about 95° C. over a period of about 0.5 hours and maintained at this temperature for an additional hour. The product obtained in this manner is a viscous fluid at room temperature.

EXAMPLE 34

A mixture of 4.6 grams of 2-hydroxyethyl acrylate, 11.3 grams of "Epon 828", 18.9 grams of DGEBD, 27 grams of DMPPD and 10 grams of dioctyl sebacate is heated in the test tube to a temperature of about 140° C. over a period of about 4.5 hours and maintained at this temperature for an additional four hours. The product obtained in this manner is fluid at room temperature.

EXAMPLE 35

A mixture of 72.3 grams of "Epon 828", 54.8 grams of DGEBD, 60 grams of iso-octyl-3-mercapto propionate, 113 grams of DMPPD, 20 grams of "Plastikator OT" (an ether-thioether plasticizer, available from Mobay Chemical Co.) and 2 ml. each of piperidine and diallylamine is heated in a one liter, three-neck, round bottom flask equipped with stirrer, reflux condenser and thermometer to a temperature of about 100° C. over a period of about two hours and maintained at this temperature for an additional five hours.

EXAMPLE 36

A mixture of 36 grams of DMPPD, 16.2 grams of monoethyl adipate, 24 grams of "Epon 828", 18 grams of DGEBD, 13.3 grams of dioctyl azelate and 0.7 grams of 2,4,6-tris(dimethylaminomethyl)phenol is heated to a temperature of about 125° C. over a period of about two hours and maintained at this temperature for an additional five hours.

EXAMPLE 37

A mixture of 27 grams of DMPPD, 6.3 grams of crotonic acid, 18 grams of "Epon 828", 13.5 grams of DGEBD, 1.7 grams of p-nonylphenol, 1.0 gram of diallylamine and 10 grams of "Plastikator OT" is heated to a temperature of about 70°–80° C. over a period of about 0.5 hour and maintained at this temperature for about eight hours to give the desired product.

EXAMPLE 38

A mixture of 5.2 grams of crotyl alcohol, 28 grams of DMPPD, 10.8 grams of "Epon 828", 18.4 grams of DGEBD, 0.5 grams of p-methoxyphenol, 0.5 grams of diallylamine and 10 grams of "Plastikator OT" is prepared and heated to a temperature of 80°–85° C. over a period of about three hours and maintained at this temperature for an additional four hours to produce the desired fluid product.

EXAMPLE 39

A mixture of 8.6 grams of acetic acid, 54 grams of DMPPD, 21.6 grams of "Epon 828", 36.6 grams of DGEBD, one gram of diallylamine, two grams of p-nonylphenol and 20.8 grams of "Plastikator OT" is heated in a 500 ml., three-neck, round bottom flask equipped with a thermometer, magnetic stirrer and reflux condenser to a temperature of about 80°–87° C. over a period of one hour and maintained at this temperature for an additional 4.5 hours.

EXAMPLE 40

A mixture of 27 grams of DMPPD, 6.3 grams of methacrylic acid, 18 grams of "Epon 828", 13.5 grams of DGEBD, 10 grams of Plastikator OT", one gram of p-methoxy phenol and one ml. of diallylamine is heated to a temperature of about 80° C. over a period of about 1.5 hour and maintained at this temperature for an additional six hours. The product obtained in this manner is a viscous liquid.

EXAMPLE 41

A mixture of 27 grams of DMPPD, 27 grams of DGEBD, 18 grams of isooctyl mercaptoacetate, and one gram each of p-nonyl phenol and dioctyl azelate is heated in a test tube to a temperature of about 100° C. over a period of about 14 hours. The product obtained in this manner is a low viscosity liquid containing some free epoxy groups as indicated by the infrared spectrum.

EXAMPLE 42

A mixture of 27 grams of DMPPD, 27 grams of DGEBD, 5.3 grams of 3-mercaptopropionic acid, 0.5 gram of piperidine and 10 grams of dioctyl azelate is heated in the test tube to a temperature of 80°–90° C. over a period of about five hours. The product obtained in this manner is a flowable viscous liquid.

EXAMPLE 43

A mixture of 31 grams of "Epon 828", 35 grams of DGEBD, 58.1 grams of DMPPD, 10.9 grams of acrylic acid, 10.8 grams of dioctyl phthalate, 2.2 grams of p-nonylphenol, and 2.2 grams of diallylamine is heated with stirring in a bath heated to a temperature of about 100°–110° C. over a period of two to 2.5 hours. The reaction mixture reaches a temperature of about 131° C. after about two hours and then begins to cool. The product obtained in this manner is a viscous fluid.

EXAMPLE 44

A mixture of 72.3 grams of "Epon 828", 54.8 grams of DMPPD, four grams of p-nonylphenol, two ml. of piperdine, two ml. of diallylamine and 20 grams of "Plastikator OT" is heated to a temperature of about 120° C. over a period of about five hours. After heating an additional hour, the product is recovered which is a fluid liquid at room temperature.

EXAMPLE 45

A mixture of 27 grams of DMPPD, 10.3 grams of "Epon 828", 5.2 grams of acrylic acid, 19.6 grams of DGEBD, 1.7 grams of p-nonylphenol, one ml. of diallylamine and 10 grams of "Triton X-100", a polyethoxylated p-nonylphenol available from Rohm & Haas Company, is heated in the test tube to a temperature of about 85°–90° C. over a period of 0.5 hour and maintained at this temperature for an additional two hours. The product is a viscous liquid.

EXAMPLE 46

A mixture of 30 grams of the product of Example 39 and five grams of powdered succinic anhydride is heated with stirring in a nitrogen atmosphere to a temperature of about 85°–95° C. over a period of about two hours and maintained at this temperature for an additional ten hours. The product obtained in this manner is a very viscous liquid at room temperature.

The above described compositions illustrate some of the compositions of the invention which are useful as antioxidants for polymeric organic substances which are subject to oxygen deterioration such as rubber, plastic compositions, vegetable oils, animal oils, mineral lubricating oils, transformer oils, liquid hydrocarbon fuels such as gasoline and fuel oil, and lubricating greases. Among the elastomeric or rubbery materials which can be stabilized with the antioxidants of this invention are those broadly described as natural and synthetic rubber. The synthetic polymers are prepared from a single monomer (homopolymer) or a mixture of two or more copolymerizable monomers (copolymers) wherein the monomers are combined in a random distribution or block or alternating form. The monomers may be substituted or unsubstituted and may possess one or more double bonds, for example, diene monomers, both conjugated and nonconjugated, and monoolefins including cyclic and acyclic monoolefins, especially vinyl and vinylidene monomers. Examples of conjugated dienes are 1,3-butadiene, isoprene, chloroprene, 2-ethyl-1,3-butadiene, 2,3-dimethyl-1,3-butadiene and piperylene. Examples of nonconjugated dienes are 1,4-pentadiene, 1,4-hexadiene and ethylidene norbornene. Examples of acyclic monoolefins are ethylene, propylene, 1-butene, isobutylene, 1-pentene and 1-hexene. Examples of cyclic monoolefins are cyclopentene and cyclohexene. Examples of vinyl monomers are styrene, acrylonitrile, acrylic acid, ethyl acrylate, butyl acrylate, acrylamide, methyl acrylate, 2-vinylpyridine, vinylbenzyl chloride, methoxyethyl acrylate, ethoxyethyl acrylate, and vinyl acetate. Examples of vinylidene monomers are methylstyrene, methacrylic acid, methyl methacrylate, ethyl methacrylate and glycidyl methacrylate. Representative examples of the synthetic polymers used in the practice of this invention are polychloroprene; homopolymers of a conjugated 1,3-diene such as isoprene or butadiene, and in particular, polyisoprenes and polybutadienes having essentially all of their repeat units combined in a cis-1,4 structure; copolymers of a conjugated 1,3-diene such as isoprene and butadiene with up to 55% by weight of at least one copolymerizable monomer including ethylenically unsaturated monomers such as styrene, acrylonitrile, methyl methacrylate or alkyl acrylate; terpolymers of butadiene with two or more copolymerizable monomers and which contain generally more than 30% butadiene and preferably more than 40% butadiene; acrylate rubbers known in the art, butyl rubber, which is a polymerization product of a major proportion of a monoolefin and a minor proportion of a polyolefin such as butadiene or isoprene; and polymers and copolymers of monoolefins containing little or no unsaturation, such as polyethylene, polypropylene, ethylene propylene copolymers and terpolymers of ethylene, propylene and nonconjugated diene such as dicyclopentadiene or 1,4-hexadiene.

The polymeric diene rubbers generally contain at least 45% by weight of the diene, and preferably contain from about 55 to 85% by weight of the diene. However, copolymers and terpolymers containing as little as 30% by weight of diene also can be employed. For example, polymers of about 35% by weight at 1,3-butadiene, 35% styrene and about 30% acrylonitrile; and of about 95–50% 1,3-butadiene and 5–50% acrylonitrile can be treated with an antioxidant of the invention.

Still other rubbery materials can be treated with the antioxidants of this invention such as polymers having curable acid groups obtained by polymerizing a major amount of an open-chain aliphatic conjugated diene with an olefinic unsaturated carboxylic acid; or by other methods known to those skilled in the art.

Polysulfide rubbers, polyacrylate rubbers, ethylene vinylacetate rubbers, chlorinated polyethylene rubbers and chlorosulfonated polyethylene rubbers also can be stabilized with the antioxidants of the invention.

Mixtures of one or more of the above described rubbery materials likewise can be treated with the antioxidants of the invention.

Plastic compositions which can be treated with the antioxidants of the invention include plasticized and unplasticized homopolymers and copolymers of olefins such as ethylene, propylene, 1-butene, etc.; polystyrene, styrene-acrylonitrile copolymers and grafted overpolymers such as styrene-acrylonitrile on polybutadiene.

Examples of other organic substances which are subject to atmospheric oxidation include vegetable oils, animal oils, mineral lubricating oils for automotive equipment, turbine oils, transforer oils, hydraulic oils including water-oil emulsion-type hydraulic oils, flushing oils, cutting oils, textile oils, asphalt, lubricating greases, liquid hydrocarbon fuels such as fuel oil, kerosene and gasoline, and synthetic oils such as dioctyl adipate and dinonyl sebacate.

The amount of the antioxidant compositions of this invention which is incorporated into the above described rubbers, plastics and oils is an amount which is sufficient to stabilize the composition and reduce oxidative deterioration. For such uses, from 0.001 up to about 15% and more by weight based on the weight of the rubber, plastic or oil, and preferably from about 0.01 to about 10% by weight of the antioxidant compositions of the invention is incorporated into the material which is to be stabilized.

It is to be understood that the rubber, plastic and oil compositions may be stabilized by incorporating therein more than one of the antioxidant compositions of the invention or combinations of the antioxidants of the invention with other known antioxidants. It also should be understood that the antioxidants of the invention can be employed in mixtures of plastic and rubbery materials and that additional materials can be used in the rubbery and plastic compositions such as conventional pigments, reinforcing agents, vulcanizing agents, accelerators and the like which are well known in the art. Similarly, when the antioxidant compositions of this invention are used in the compounding of oils, greases, etc., other known lubricant additives can be included such as dispersants, detergents, foam-inhibitors, pour depressants, oiliness agents and viscosity index improvers.

The antioxidant compositions of the invention may be incorporated into rubbery and plastic materials by any of the conventional processes. The antioxidants may be added to aqueous latices and dispersions of rubbery and plastic materials prior to coagulation and precipitation of the rubber whereby the antioxidant is intimately mixed with the precipitated polymer. Alternatively, the antioxidant compositions of the invention may be added to the rubber or plastic materials along with curing agents, fillers, etc. on a mill or in an internal mixer prior to subsequent forming and/or curing operations.

The aqueous latices and dispersions of synthetic rubbery polymer are prepared by methods well known in the art. For instance, a rubbery copolymer of about 70% by weight of 1,3-butadiene and 30% by weight of acrylonitrile is prepared in an aqueous medium in the presence of a suitable polymerization catalyst in the range of from about 15 to 40% total solids. The aqueous medium may be emulsifier free or it may contain an emulsifier. Suitable emulsifiers include conventional alkali metal soaps, sulfates and sulfonates such as sodium lauryl sulfate, the alkali metal salts of petroleum or paraffin oils, the sodium salts of aromatic sulfonic acids such as the sodium salt of naphthalene sulfonic acid, the sodium salts of dodecane-1-sulfonic acid, octadecane-1-sulfonic acid, etc., aralkyl sulfonates such as sodium isopropyl benzene sulfonate, sodium dodecyl benzene sulfonate and sodium isobutyl napthalene sulfonate; alkali metal salts of sulfonate dicarboxylic acid esters and amides such as sodium dioctyl sulfosuccinate or sodium N-octadecyl sulfosuccinamate. The cationic emulsifiers such as the salts of strong inorganic acids and organic bases containing long carbon chains, for example, lauryl amine hydrochloride, the hydrochloride of diethylaminoethyldecylamine, trimethyl cetyl ammonium bromide, dodecyl trimethyl ammonium bromide and the diethylcyclohexylamine salt of cetyl sulfuric ester also may be used. Preferred, however, are the alkali metal salts of long chain carboxylic acids and alkali metal salts of aromatic sulfonic acids and the sodium salts of aralkyl sulfonates. In addition to the above, non-ionic emulsifiers such as the polyether alcohols prepared by condensing ethylene oxide with higher alcohols, the fatty alkylolamine condensates and the diglycol esters of lauric, oleic and stearic acids may be used.

The catalyst, required for satisfactory polymerization, may be any of those commonly employed for the polymerization of diene hydrocarbons including the various peroxygen compounds such as hydrogen peroxide, benzoyl peroxide, cumene hydroperoxide, tertiary butyl hydroperoxide, and tertiary butyl perbenzoate. Generally from about 0.01 to about three parts of the catalyst is employed per hundred parts by weight of the monomers in the polymerization charge.

The incorporation of the antioxidants of this invention into a latex such as a nitrile rubber latex is accomplished by well known techniques. Usually, an emulsion or suspension of the antioxidant is first prepared and this is added to the latex. For example, 26.5 grams of the antioxidant of the invention such as the product of Example 2 are dissolved in 50 grams of isopropyl acetate, and this solution is added with stirring to 100 grams of distilled water containing 2.2 grams of the sodium salt of a dodecylbenzene sulfonate at pH 8-10. This mixture is passed through a hand homogenizer three times. The emulsion is concentrated under reduced pressure using a rotating evaporator, and then added to a latex with stirring. If a cationic emulsifier is used, the antioxidant emulsion or suspension would likewise be made with a compatible emulsifier before addition to the latex. The latex then is coagulated in the normal manner.

Other solvents for the antioxidant compositions such as benzene, toluene, etc. can be used in lieu of the isopropyl acetate. The amounts specified above are illustrative only and may be varied depending on the particular antioxidant compound. The concentration step is not essential and may be eliminated.

Vulcanization of the rubbers and elastomers containing the antioxidants of this invention can be effected with peroxides, sulfur curing agents with or without secondary accelerators. Procedures and cure systems for vulcanizing rubbers and elastomers are well known in the art.

The following examples illustrate some of the various rubber and plastic compositions of the invention prepared by adding the antioxidant compositions of the invention to a masterbatch of nitrile rubber. Unless otherwise indicated, the masterbatch comprises the following ingredients and is prepared by mixing in a Banbury mixer.

| | Parts by Weight |
|---|---|
| NBR (a butadiene: acrylonitrile rubber containing about 32% of acrylonitrile) | 100.0 |
| Stearic Acid | 1.0 |
| Precipitated silica | 35.0 |
| Gamma-mercaptopropyltrimethoxysilane | 0.4 |
| Thermal Carbon Black N990 | 30.0 |
| Zinc Oxide | 5.0 |
| Magnesium Oxide | 5.0 |

The sulfur curing agents and the antioxidant compositions of the invention are added to the masterbatch on a mill in the amounts normally used in the art such as shown in the tables below, and the compounds are cured to a full cure as determined by a curometer measurement such as on the Monsanto Rheometer. The utility of the antioxidant compositions of this invention as stabilizers for rubbery compositions is demonstrated by the results of the tests on the various compounds reported in the tables. As can be seen from the test results, the antioxidant compositions of the invention improve the ability of the rubbery compositions to retain the desirable mechanical properties after a period of aging, and the ability of the antioxidant compositions of the invention to resist extraction by solvents such as acetone also is demonstrated by the aging results after extraction. Although not all of the compositions and tests reported in Tables A-D were prepared and conducted at the same time, or under identical conditions, the results reported in the tables indicate quite clearly the relative effectiveness of the antioxidants of the invention and particularly, the superior air aging characteristics of rubber compositions containing such antioxidants.

The non-fugitivity of the antioxidants of the invention is determined by subjecting the cured rubber compositions to the following extraction and aging test. Three dumbbells of each of the rubber compositions are extracted with acetone at room temperature for 16 to 24 hours in separate bottles. The acetone is decanted, and the samples are de-swollen in methanol. The extraction procedure is repeated twice whereupon the samples are first air and then vacuum dried, and air aged for seven days in a test tube at 257° F. (125° C.). The properties of these aged rubber compositions are determined so that comparisons may be made with the properties of the original cured rubber compositions and with other extracted and aged samples to evaluate the effectiveness of the antioxidants.

The air aging test follows the standard ASTM air test tube procedure (D-865).

In the following Tables A-D, the tensile strength at break (psi, determined with a table model Instron), percent elongation at break, and hardness (Shore Durometer A) of the rubber compositions are reported for the rubber samples as cured, after air aging for three days at 300° F. (149° C.) and for rubber samples subjected to the acetone extraction procedure followed by air test tube aging for seven days at 257° F. (125° C.).

As mentioned earlier, an important property of the compositions of this invention is the non-extractability of the antioxidants from the cured rubber compositions by known solvents. In evaluating these antioxidants in any rubber, the retention of the mechanical properties after the acetone extraction and the period of aging is usually a criterion of success. The most sensitive measure probably is the retention of elongation in those rubbers which have a natural tendency to embrittle upon aging. Since the nitrile rubbers are particularly susceptible to embrittlement on aging, the results of the tests reported below have particular significance in establishing the effectiveness of the antioxidants. Accordingly, a value for ΔE is recorded in the following tables and is a measure of the change in percent elongation at break after the aging period under the conditions indicated. This value is calculated as follows:

$$\Delta E = \frac{\text{Original elongation} - \text{Final elongation}}{\text{Original elongation}} \times 100$$

In the following tables of rubber compositions of the invention, the amounts of the ingredients are expressed in parts by weight per 100 parts by weight of rubber.

TABLE A

Rubber Compositions and Properties

| Composition | A | B | C | D | E | F |
|---|---|---|---|---|---|---|
| Masterbatch | | | | | | |
| TMTD* | 1.5 | 1.5 | 1.5 | 1.8 | 1.8 | 1.8 |
| morpholinyl disulfide | 1.0 | 1.0 | 1.0 | 1.0 | 1.0 | 1.0 |
| Product of Example 1A | 4.0 | | | | | |
| 1B | | 4.0 | | | | |
| 1C | | | 4.0 | | | |
| 1D | | | | 4.0 | | |
| 14 | | | | | 4.0 | |
| 15 | | | | | | 4.0 |
| Original, cured at 170° C. | | | | | | |
| Tensile | 2600 | 2850 | 2120 | 2180 | 2445 | 2750 |
| Elongation | 675 | 640 | 440 | 520 | 580 | 620 |
| Hardness | 70 | 70 | 74 | 68 | 65 | 63 |
| Air Aged 3 days at 149° C. | | | | | | |
| Tensile | 2300 | 2230 | 1670 | 1520 | 2280 | 2300 |
| Elongation | 345 | 315 | 275 | 220 | 225 | 320 |
| Hardness | 77 | 77 | 79 | 80 | 79 | 79 |
| ΔE | −49 | −51 | −38 | −58 | −45 | −48 |
| Extracted: Air Aged 7 days at 125° C. | | | | | | |
| Tensile | 2750 | 2450 | 1810 | 2000 | 2280 | 2015 |
| Elongation | 380 | 360 | 260 | 275 | 265 | 235 |
| Hardness | 78 | 78 | 78 | 80 | 75 | 76 |
| ΔE | −44 | −44 | −41 | −47 | −55 | −62 |

*tetramethylthiuram disulfide

TABLE B

Rubber Compositions and Properties

| Composition | G | H | I | J | K | L | Control |
|---|---|---|---|---|---|---|---|
| Masterbatch | * | * | | | | | |
| TMTD | 1.5 | 1.5 | 1.8 | 1.8 | 1.8 | 1.8 | 1.8 |
| morpholinyl disulfide | 1.0 | 1.0 | 1.0 | 1.0 | 1.0 | 1.0 | 1.0 |
| Product of Example | | | | | | | |
| 6 | 4.0 | | | | | | |
| 7 | | 4.0 | | | | | |
| 8 | | | 4.0 | | | | |
| 9 | | | | 4.0 | | | |
| 16 | | | | | 3.0 | | |
| 19 | | | | | | 3.0 | |
| Commercial Antioxidant** | | | | | | | 3.0 |
| Original, cured at 170° C. | | | | | | | |
| Tensile | 2900 | 2950 | 2235 | 1130 | 2635 | 2430 | 2720 |
| Elongation | 880 | 660 | 735 | 725 | 590 | 585 | 590 |
| Hardness | 66 | 71 | 60 | 62 | 65 | 66 | 65 |
| Air Aged 3 days at 140° C. | | | | | | | |
| Tensile | 990 | 1120 | 1215 | 1500 | 2180 | 1980 | 2115 |
| Elongation | 100 | 120 | 210 | 220 | 285 | 225 | 270 |
| Hardness | 78 | 100 | 77 | 76 | 79 | 81 | 75 |
| ΔE | −89 | −82 | −72 | −70 | −52 | −61 | −54 |
| Extracted: Air Aged 7 days at 120° C. | | | | | | | |
| Tensile | 2200 | 2240 | 1960 | 890 | 1635 | 1480 | 485 |
| Elongation | 260 | 325 | 245 | 50 | 180 | 175 | 5 |
| Hardness | 80 | 80 | 78 | 84 | 77 | 76 | 90 |

TABLE B-continued

Rubber Compositions and Properties

| Composition | G | H | I | J | K | L | Control |
|---|---|---|---|---|---|---|---|
| ΔE | −71 | −51 | −67 | −89 | −69 | −70 | −99 |

*No magnesium oxide in masterbatch.
**Predominately 1,4-bis(α,α'-dimethylbenzyl)diphenylamine

TABLE C

Rubber Compositions and Properties

| Composition | M | N | O | P | Q | R | S |
|---|---|---|---|---|---|---|---|
| Masterbatch | | | | * | | | |
| TMTD | 1.8 | 1.8 | 1.5 | 1.5 | 1.8 | 1.5 | 1.8 |
| morpholinyl disulfide | 1.0 | 1.0 | 1.0 | 1.0 | 1.0 | 1.0 | 1.0 |
| Product of Example | | | | | | | |
| 2 | 4.0 | | | | | | |
| 3 | | 4.0 | | | | | |
| 4 | | | 4.0 | | | | |
| 5 | | | | 4.0 | | | |
| 17 | | | | | 4.0 | | |
| 18 | | | | | | 4.0 | |
| 12 | | | | | | | 3.0 |
| Original, cured at 170° C. | | | | | | | |
| Tensile | 2520 | 2400 | 2430 | 3030 | 2465 | 2500 | 2205 |
| Elongation | 635 | 580 | 650 | 720 | 655 | 650 | 510 |
| Hardness | 64 | 64 | 70 | 66 | 64 | 70 | 66 |
| Air Aged 3 days at 149° C. | | | | | | | |
| Tensile | 2070 | 1745 | 1150 | 1250 | 2080 | 1400 | 1160 |
| Elongation | 270 | 210 | 125 | 135 | 320 | 195 | 125 |
| Hardness | 75 | 79 | 81 | 76 | 74 | 75 | 84 |
| ΔE | −58 | −64 | −81 | −81 | −51 | −70 | −76 |
| Extracted: Air Aged 7 days at 125° C. | | | | | | | |
| Tensile | 1200 | 970 | 2030 | 1980 | 1290 | 1330 | 1985 |
| Elongation | 310 | 235 | 300 | 220 | 385 | 180 | 215 |
| Hardness | 78 | 77 | 79 | 76 | 74 | 77 | 76 |
| ΔE | −51 | −60 | −54 | −69 | −41 | −72 | −58 |

*No magnesium oxide in masterbatch.

TABLE D

Rubber Compositions and Properties

| Composition | T | U | V | W | X | Y | Control |
|---|---|---|---|---|---|---|---|
| Masterbatch | | | | | | | |
| TMTD | 1.8 | 1.8 | 1.8 | 1.8 | 1.8 | 1.8 | 1.8 |
| morpholinyl disulfide | 1.0 | 1.0 | 1.0 | 1.0 | 1.0 | 1.0 | 1.0 |
| Product of Example | | | | | | | |
| 31 | 0.76 | 2.28 | 3.81 | | | | |
| 32 | | | | 2.06 | | | |
| 29 | | | | | 2.0 | | |
| 30 | | | | | | 3.0 | |
| Commercial antioxidant* | | | | | | | 2.0 |
| Original, cured at 170° C. | | | | | | | |
| Tensile | 2700 | 2620 | 2490 | 2755 | 2695 | 2640 | 2575 |
| Elongation | 610 | 660 | 615 | 665 | 570 | 705 | 595 |
| Hardness | 70 | 70 | 69 | 68 | 68 | 65 | 69 |
| Air Aged 3 days at 149° C. | | | | | | | |
| Tensile | 2510 | 2505 | 2465 | 2260 | 2560 | 2430 | 2160 |
| Elongation | 290 | 365 | 385 | 330 | 335 | 320 | 225 |
| Hardness | 75 | 75 | 78 | 75 | 75 | 80 | 80 |
| ΔE | −52 | −45 | −37 | −50 | −41 | −55 | −62 |
| Extracted: Air Aged 7 days at 125° C. | | | | | | | |
| Tensile | 1010 | 2435 | 2405 | 2435 | 1260 | 2630 | 675 |
| Elongation | 105 | 365 | 410 | 365 | 135 | 375 | 25 |
| Hardness | 82 | 80 | 79 | 80 | 80 | 80 | 85 |

TABLE D-continued

Rubber Compositions and Properties

| Composition | T | U | V | W | X | Y | Control |
|---|---|---|---|---|---|---|---|
| ΔE | | −83 | −45 | −33 | −45 | −76 | −47 −96 |

*N,N'-dinaphthyl-p-phenylenediamine

The embodiments of the invention in which an exclusive property or privilege is claimed are defined as follows:

1. A composition useful as an antioxidant which comprises the reaction product of a mixture of
   (a) at least one compound selected from compounds having the formula

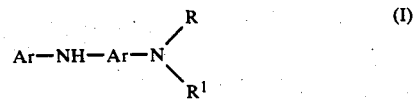

wherein each Ar is an aromatic group, and R and $R^1$ are each independently hydrogen, alkyl, substituted alkyl, oxyalkylene or —C(O)—$R^2$—COOH groups wherein $R^2$ is an alkylene or alkenylene group, with the proviso that at least one of the R and $R^1$ groups must be hydrogen or a group containing at least one substituent reactive with an epoxy group, and Ar-NH-Ar-O-$R^3$ (II)

wherein Ar is as defined above and $R^3$ is hydrogen, or a substituted alkyl group containing at least one substituent reactive with an epoxy group, or —C(O)—$R^2$—COOH wherein $R^2$ is an alkylene or alkenylene group, and
   (b) at least one polyepoxide having at least 2 epoxy groups per molecule.

2. The composition of claim 1 wherein the polyepoxide is a polyether polyepoxide.
3. The composition of claim 2 wherein the polyether polyepoxide is a glycidyl polyether of a polyhydric alcohol or a polyhydric phenol.
4. The composition of claim 1 wherein the polyepoxide is a cyclic polyepoxide.
5. The composition of claim 1 wherein the polyepoxide comprises a mixture of a polyepoxide and a monoepoxide.
6. The composition of claim 5 wherein the monoepoxide is an epihalohydrin.
7. The composition of claim 1 wherein the antioxidant compound (a) in the mixture has the formula

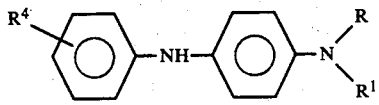

wherein $R^4$ is hydrogen, $A_2N$ or AO wherein A is an alkyl or substituted alkyl group, and R and $R^1$ are as defined in claim 1.

8. The composition of claim 7 wherein R, $R^1$ and $R^4$ are hydrogen.
9. The composition of claim 7 wherein R and $R^4$ are hydrogen and $R^1$ is an alkyl group.
10. The composition of claim 7 wherein R and optionally $R^1$ are hydroxy oxyalkylene radicals having the formula —($R^5$—$O_n$)—H wherein $R^5$ is ethylene or 1,2-propylene, n varies from one to about 20, and $R^4$ is hydrogen.

11. The composition of claim 1 wherein the mixture also contains (c) one or more co-reactants for the polyepoxide selected from the group consisting of organic carboxylic acids, dicarboxylic acid monoesters, dicarboxylic acids, alcohols, thioalcohols, phenols, thiophenols, aliphatic monoamines, aliphatic diamines, mercaptoacids, mercaptoacid esters, alkylthiocarboxylic acids and arylthiocarboxylic acids.
12. The composition of claim 11 wherein the co-reactant is a saturated or unsaturated carboxylic acid or a mercaptoacid or ester.
13. The composition of claim 12 wherein the acid is acrylic or methacrylic acid.
14. The composition of claim 8 wherein the polyepoxide is a glycidyl ether of an aliphatic polyhydroxy compound or an alkylene bis-phenol compound.
15. The composition of claim 14 wherein the polyepoxide is a diglycidyl ether of 1,4-butylene glycol.
16. The composition of claim 14 wherein the polyepoxide is the diglycidyl ether of a 4,4'-alkylene bisphenol compound.
17. A composition useful as an antioxidant which comprises the reaction product of claim 1 further reacted with a dicarboxylic anhydride in a molar ratio of up to 1:2.
18. A composition useful as an antioxidant which comprises the reaction product of claim 7 further reacted with a dicarboxylic anhydride in a molar ratio of up to 1:2.
19. The composition of claim 18 wherein the anhydride is maleic or succinic anhydride.
20. An aqueous rubber latex comprising water, 100 parts by weight of rubber polymer and from about 0.01 to about 10 parts by weight, based on the weight of the rubber polymer, of an antioxidant composition which comprises the reaction product of a mixture of
   (a) at least one compound selected from compounds having the formula

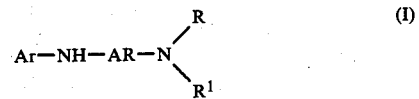

wherein each Ar is an aromatic group, and R and $R^1$ are each independently hydrogen, alkyl, substituted alkyl, oxyalkylene or —C(O)—$R^2$—COOH groups wherein $R^2$ is an alkylene or alkenylene group, with the proviso that at least one of the R and $R^1$ groups must be hydrogen or a group containing at least one substituent reactive with an epoxy group, and Ar-NH-Ar-O-$R^3$ (II)

wherein Ar is as defined above and $R^3$ is hydrogen, or a substituted alkyl group containing at least one substituent reactive with an epoxy group, or —C(O)—$R^3$—COOH wherein $R^2$ is an alkylene or alkenylene group, and
   (b) at least one polyepoxide having at least 2 epoxy groups per molecule.

21. The latex of claim 20 wherein the rubber polymer is a diene rubber polymer.

22. The latex of claim 21 wherein the diene rubber contains at least 45% of a conjugated diene.

23. The latex of claim 22 wherein the diene rubber is a rubbery polymer of a diene having 4 to 8 carbon atoms.

24. The latex of claim 22 wherein the diene rubber is a copolymer of butadiene and acrylonitrile.

25. The latex of claim 20 wherein the mixture also contains (c) one or more co-reactants for the polyepoxide selected from the group consisting of organic carboxylic acids, dicarboxylic acid monoesters, dicarboxylic acids alcohols, thioalcohols, phenols, thiophenols, aliphatic monoamines, aliphatic diamines, mercaptoacids, mercaptoacid esters, alkylthiocarboxylic acids and arylthiocarboxylic acids.

26. The latex of claim 20 wherein the reaction product further is reacted with a dicarboxylic anhydride in a molar ratio of up to 1:2.

27. The latex of claim 25 wherein the reaction product further is reacted with a dicarboxylic anhydride in a molar ratio of up to 1:2.

28. A vulcanizate of a rubber polymer stabilized against attack by atmospheric oxygen by the inclusion therein of an effective amount of a composition which comprises the reaction product of a mixture of
(a) at least one compound selected from compounds having the formula

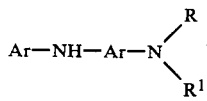
(I)

wherein each Ar is an aromatic group, and R and $R^1$ are each independently hydrogen, alkyl, substituted alkyl, oxyalkylene or $-C(O)-R^2-COOH$ groups wherein $R^2$ is an alkylene or alkenylene group, with the proviso that at least one of the R and $R^1$ groups must be hydrogen or a group containing at least one substituent reactive with an epoxy group, and

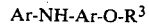
(II)

wherein Ar is as defined above and $R^3$ is hydrogen, or a substituted alkyl group containing at least one substituent reactive with an epoxy group, or $-C(O)-R^2-COOH$ wherein $R^2$ is an alkylene or alkenylene group, and
(b) at least one polyepoxide having at least 2 epoxy groups per molecule.

29. The vulcanizate of claim 28 wherein the rubber polymer is a diene rubber polymer.

30. The vulcanizate of claim 29 wherein the diene rubber polymer contains at least 45% of a conjugated diene.

31. The vulcanizate of claim 30 wherein the diene rubber is a rubber polymer of a diene having 4 to 8 carbon atoms.

32. The vulcanizate of claim 30 wherein the diene rubber is a copolymer of butadiene and acrylonitrile.

33. The vulcanizate of claim 28 wherein from about 0.01 to about 10 parts of the antioxidant is included into the rubber polymer.

34. The vulcanizate of claim 28 wherein the mixture used to form the reaction product also contains (c) one or more co-reactants for the polyepoxide selected from the group consisting of organic carboxylic acids, dicarboxylic acid monoesters, dicarboxylic acids alcohols, thioalcohols, phenols, thiophenols, aliphatic monoamines, aliphatic diamines, mercaptoacids, mercaptoacid esters, alkylthiocarboxylic acids and arylthiocarboxylic acids.

35. The vulcanizate of claim 28 wherein the reaction product further is reacted with a dicarboxylic anhydride in a molar ratio of up to 1:2.

36. The vulcanizate of claim 34 wherein the reaction product further is reacted with a dicarboxylic anhydride in a molar ratio of up to 1:2.

* * * * *